Aug. 17, 1926.
A. GIOVANNETTI
1,596,652
MOLD FOR AND METHOD OF MAKING EDIBLE FOOD PRODUCTS
Filed March 24, 1926  2 Sheets-Sheet 2
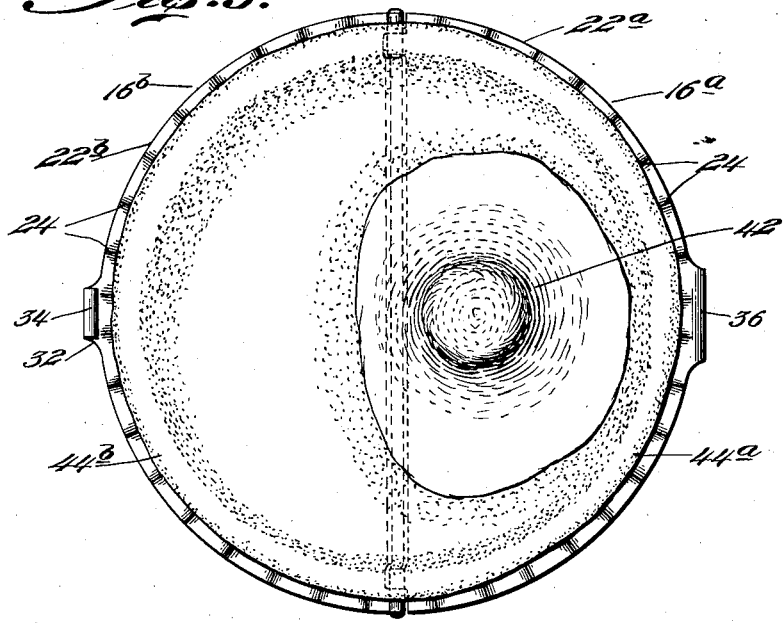
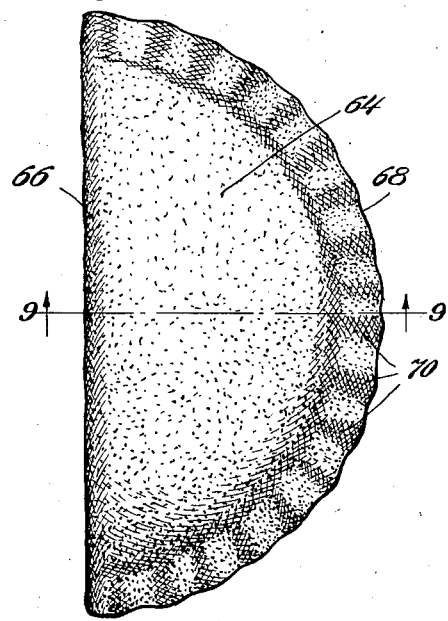
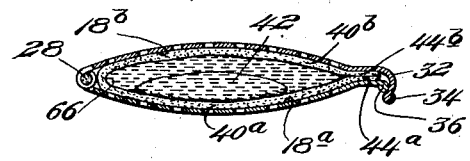
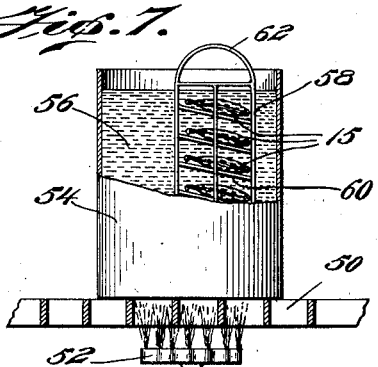

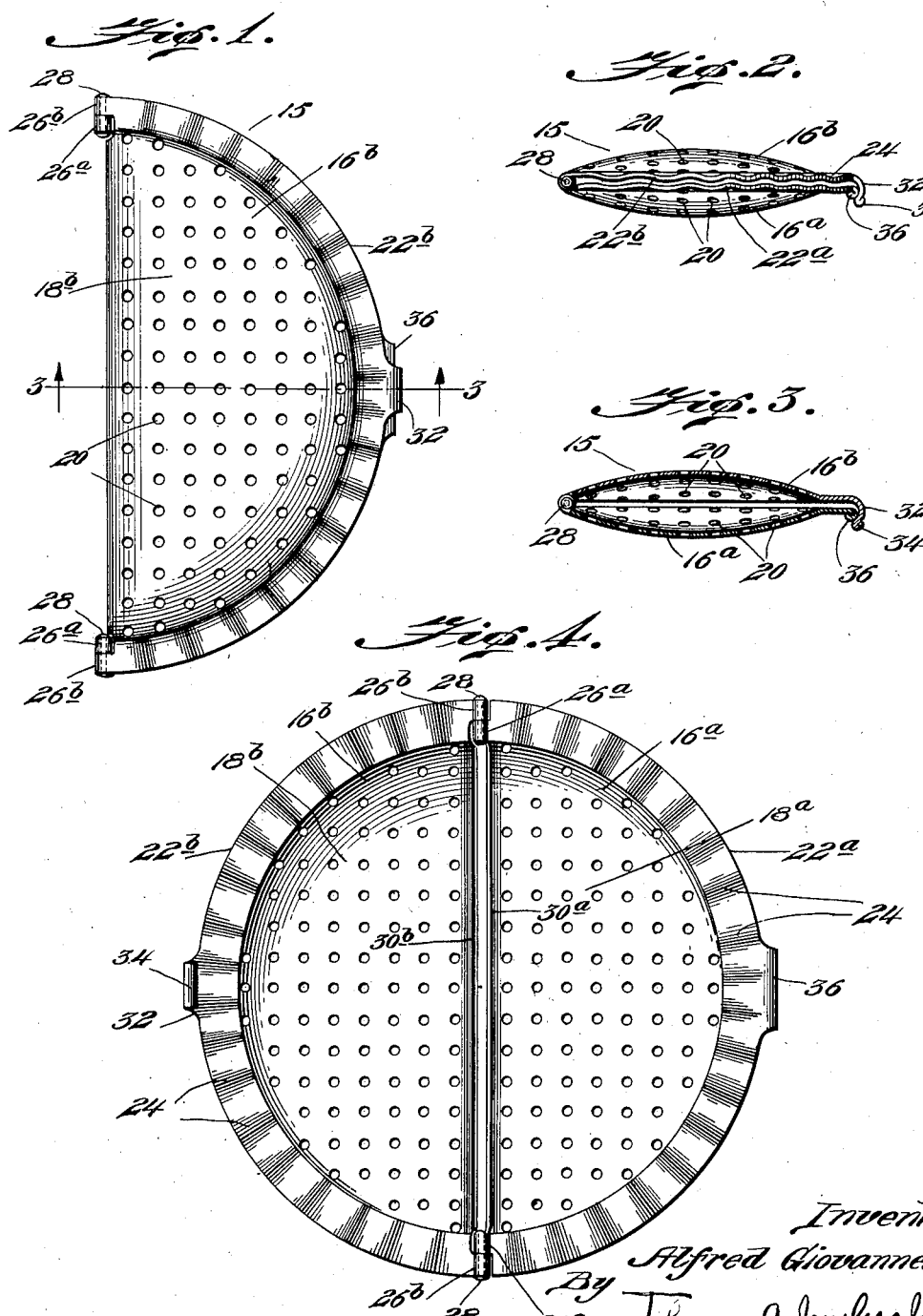

Patented Aug. 17, 1926.

1,596,652

UNITED STATES PATENT OFFICE.

ALFRED GIOVANNETTI, OF PROVIDENCE, RHODE ISLAND, ASSIGNOR OF ONE-HALF TO GAETANO PETRONE, OF PROVIDENCE, RHODE ISLAND.

MOLD FOR AND METHOD OF MAKING EDIBLE FOOD PRODUCTS.

Application filed March 24, 1926. Serial No. 97,097.

My invention relates to a mold for use in producing a substantially uniformly cooked article of food of novel construction, said uniformly cooked article of food, and the method of its manufacture.

So far as I am aware no one has hitherto conceived of encasing an article of food, preferably a raw egg, within a thin layer or layers of dough, frying said article while compressing the free edges of said layer of dough together to prevent any of the oil or frying material from reaching the encased contents, to form a substantially uniformly cooked article of food. If, as in my preferred embodiment, a raw egg is encased within said layer of dough and the article fried as just explained, the dough and the egg will be substantially uniformly cooked to form a compact, tasty, delicious, palatable fried article of food, the egg and the layer of dough forming a unitary food product. It is evident that a food product produced by my invention is not only tasty but decidedly nutritious and provides a palatable article of food particularly if served when hot, almost a complete meal in itself.

So far as I am aware the method I employ of laying an article of food in a raw condition on a portion of a thin layer of dough, folding over the other portion of said layer of dough on said food until the free edges of said layers of dough engage with each other and frying said article in oil or other frying material while pressing the free edges of said layers of dough together, is also broadly new.

While I am aware that others have provided molds for frying pie crusts, French fried potatoes and other similar articles in oil or other frying material, so far as I am aware no one has hitherto provided a mold having its edge flanges clamped together in spaced relationship to integrally unite the edges of the layers of dough of an article together during a frying process.

These and such other objects of my invention as may hereinafter appear will be best understood from a description of one embodiment of the mold, completed food article and method of its manufacture as illustrated by the accompanying drawings.

In the drawings, Fig. 1 is a plan view of the mold in clamped, closed position.

Fig. 2 is an edge elevation of the mold.

Fig. 3 is a central sectional view of the mold taken along the line 3—3 of Fig. 1.

Fig. 4 is a plan view of the open mold.

Fig. 5 is a plan view of the open mold having the thin layer of dough inserted thereon and a raw egg inserted in one section of the mold prior to folding the mold.

Fig. 6 is a diagrammatic sectional view similar to Fig. 3, showing the closed mold encasing the layer of dough and raw egg.

Fig. 7 is a diagrammatic view showing a plurality of molds on the shelves of a rack inserted in a bath of frying material.

Fig. 8 is a plan view of the fried food product.

Fig. 9 is a cross sectional view along the line 9—9 of Fig. 8 of the fried food product.

In the drawings, wherein like characters of reference indicate like parts throughout, 15 generally indicates a mold for use in my invention. Though the mold 15 may be constructed of any suitable shape, it preferably comprises the two substantially semicircular members $16^a$ and $16^b$ having the concaved body portions $18^a$ and $18^b$. Said concaved body portions $18^a$ and $18^b$ are also preferably provided with the perforations 20. The mold members $16^a$ and $16^b$ are also preferably provided with the peripheral flanges $22^a$ and $22^b$ which are preferably crinkled as at 24. To pivotally join said members together, I preferably provide the pivot ears $26^a$ on diametrically opposed ends of the peripheral flange $22^a$ of member $16^a$ and the cooperating pivot ears $26^b$ on the diametrically opposed ends of the peripheral flange $22^b$ of the member $16^b$ and I pivotally secure said members to each other by inserting the pivot pins 28 through said adjacent cooperating ears. It is obvious that as the cooperating diametric edges $30^a$ and $30^b$ of said members $16^a$ and $16^b$ respectively are concaved, that when said members are pivoted to a closed position (Fig. 3) said diametric edges $30^a$ and $30^b$ will be secured to each other in spaced relationship. I also provide means to clamp the peripheral flanges $22^a$ and $22^b$ of said members $16^a$ and $16^b$ to each other in spaced relationship, in my preferred embodiment, said means preferably comprising the extended, downwardly projecting bent spring lug 32 formed preferably integrally with the flange 22ᵇ, having the end 34 adapted to overlappingly engage with a diametrically opposed lug 36 on the flange 22ᵃ. It is obvious, however, that any type of hinge means may be employed to pivotally secure the unflanged edges of said members to each other in spaced relationship and any type of means to clamp the edge flanges of said members to each other in spaced relationship may be employed without departing from the spirit of my invention. Though I have shown a substantially round mold 15, it is also obvious that it may be constructed of any suitable shape.

To manufacture my preferred food product, I first prepare a thin sheet of pastry or dough, preferably made up in the usual manner, in the following proportions: one pint water, two pounds flour, one-quarter pint olive oil, one egg, one hundred drops of anisette essence, salt to taste. The mold 15 is then spread out in open form as shown in Fig. 5 and the thin layer of uncooked dough or pastry 40 laid over each portion thereof. As the portions 18ᵃ and 18ᵇ of said mold are preferably concaved, as hitherto explained, to form the cavities 18ᵃ and 18ᵇ, it is obvious that the desired article of food may be laid in one of said cavities. As shown in Fig. 5, I preferably drop a raw egg 42 into the cavity 18ᵃ on top of the layer of dough 40 in said cavity. Although, as explained, the preferred embodiment of my invention comprises a fried "egg pie", it is obvious that in place of inserting the raw egg 42 therein, any type of raw or partially cooked food product may be inserted in said cavity 18ᵃ in place of said egg. The mold 15 is then folded over by folding the section 16ᵇ on top of the section 16ᵃ. It is obvious that the single layer of dough 40 will be then formed into the lower layer 40ᵃ and the upper layer 40ᵇ. As explained, the mold section 16ᵇ is folded on top of the mold section 16ᵃ until the extended bent spring lug 32 on the section 16ᵇ overlaps the lug 36 on the section 16ᵃ, thus clamping said mold sections 16ᵃ and 16ᵇ to each other in spaced relationship and compressing the peripheral edges 44ᵃ and 44ᵇ of the layers of dough 40ᵃ and 40ᵇ respectively to integrally unite said edges and bind said edges together until the latch means of said mold sections is released. It is obvious that the mold and its contents are now ready for the frying operation.

Whereas, if desired, each individual mold 15 may be provided with a handle for inserting it into a bath of frying material, I preferably simultaneously fry a plurality of said molds and contents as diagrammatically illustrated in Fig. 7. While any suitable type of frying material raised to a frying temperature may be employed, fat, grease, oil or otherwise, I have obtained the best results by frying in vegetable cooking oil. As shown in Fig. 7, 50 represents the top of any suitable type of range suitably heated in any suitable manner by a source of heat, as shown by the gas burner 52. The comparatively large frying pot 54 is placed above the gas burner 52, said frying pot containing the frying material 56. A rack 58, provided with the inclined shelves 60 and the handle 62 is provided. The molds 15 are then inserted on the inclined shelves 60 of said rack 58 and the entire rack 58 is lifted up by means of the handle 62 and inserted within the frying pot 54, so that all the molds 15 are immersed within the frying material 56. Though I have shown only one rack 58 in the frying bath 56, it is obvious that a plurality of such racks may be employed to simultaneously fry a still larger number of molds and their contents. It is obvious that while said mold contents are being fried, that the edges 44ᵃ and 44ᵇ of said layers of dough 40ᵃ and 40ᵇ are continuously compressed by the clamping flanges 22ᵃ and 22ᵇ of the mold, and that as said layers of dough or pastry tend to expand under heat and cannot due to the spaced flanges 24 they will be integrally united by compression during the initial stages of the frying operation. The frying operation is continued for the desired period of time until the outside of the layers of dough 40 turns to a crisp brown, normally for about one and one-half minutes. The layers of dough 40 prevent the frying bath from affecting the egg or other contents, which become cooked free from the frying bath.

The rack 58 is then removed from the bath 56. The individual molds 15 are removed from the rack and opened up and the uniformly cooked, completely sealed "egg pies" 64 are then removed from their respective molds 15.

It is obvious that in the broader aspects of my invention, it comprises a method of producing an edible food product by forming a thin layer of dough, placing an article of food on a portion of said layer, folding the other portion of said layer over said food until the free edges of said layers of dough engage with each other and frying said article in oil while pressing the free edges of said layers of dough together to form a completely sealed, uniformly cooked article of food. It is obvious that instead of having the mold sections 16ᵃ and 16ᵇ permanently hinged together, they may consist of two separate members which may be clamped together around their peripheral or edge flanges in any suitable manner and thus in place of forming one thin layer of dough and folding one portion of it on top of another, two distinct layers of dough may be formed provided they have their peripheral edges similarly pressed together during the frying operation.

When the article 64 is removed from the mold 15, it is obvious that in my preferred embodiment, it will comprise a semi-circular article having a folded edge 66 and an integrally united peripheral edge 68, preferably crinkled as at 70, if the edges of the mold are crinkled as at 24 and will encase the article 72 therein uniformly cooked therewith. Where an egg 42 is employed as the contents of said layer of dough 40, it is obvious that the egg 42 will become cooked in approximately the same length of time it takes to brown and thoroughly fry the outside of the dough and that the egg 42 and dough 40 are substantially uniformly cooked throughout and that the white 74 of the egg will unite with the edges of the layer of dough to form a palatable, novel, unitary food product. It is obvious that I have constructed the layer of dough 40 so thin that the entire food article is substantially uniformly cooked throughout.

In the claims I employ the word "raw" in the sense that the article is not thoroughly prepared by cooking for actual service, although, if desired, it may be partially cooked prior to the frying operation. Bacon, meat, potatoes, muzzarella or other cheese, are types of articles that may be used in place of or with an egg. Though in the claims I employ the word "dough", it is obvious that any type of pastry or dough suitable for this purpose may be employed. In the claims, I employ the word "concave" in the sense that it is shaped to hold an article therein and it is immaterial whether it be of true concaved shape, pan shaped or otherwise. In the claims, I also employ the word "semi-circular" as being of a generally semi-circular configuration, though the exact shape thereof may be elliptical or the edges thereof form a broken line.

It is obvious that I have provided a palatable, delicious, nutritious and novel article of food which may be readily manufactured in an economical manner.

It is understood that my invention is not limited to the specific embodiment shown or method described, and that various deviations may be made therefrom without departing from the spirit and scope of the appended claims.

What I claim as new and desire to secure by Letters Patent is:

1. A mold for use in frying edible food products comprising two substantially semi-circular members having concaved perforated body portions and crinkled peripheral flanges, hinge means to pivotally secure the diametric edges of said members to each other in substantially unobstructed spaced relationship and means to clamp the peripheral flanges of said members to each other in substantially unobstructed spaced relationship.

2. A mold for use in frying edible food products comprising two substantially semi-circular members having concaved perforated body portions and peripheral flanges, hinge means to pivotally secure the diametric edges of said members to each other and means to clamp the peripheral flanges of said members to each other in substantially unobstructed spaced relationship.

3. A mold for use in frying edible food products comprising two substantially semi-circular members having concaved body portions and peripheral flanges, hinge means to pivotally secure the diametric edges of said members to each other in substantially unobstructed spaced relationship and means to clamp the peripheral flanges of said members to each other in substantially unobstructed spaced relationship.

4. A mold for use in frying edible food products comprising two substantially semi-circular members having concaved perforated body portions and crinkled peripheral flanges, hinge means on diametrically opposed ends of the peripheral flanges of each member secured to hinge means on adjacent diametrically opposed ends of the peripheral flanges of the other member to pivotally secure the diametric edges of said members to each other in substantially unobstructed spaced relationship and means to clamp the peripheral flanges of said members to each other in substantially unobstructed spaced relationship comprising an extended bent spring lug projecting from the peripheral flange of one member adapted to overlappingly engage a diametrically opposed lug on the peripheral flange of the other member.

5. A mold for use in frying edible food products comprising two substantially semi-circular members having concaved body portions and peripheral flanges, hinge means on diametrically opposed ends of the peripheral flanges of each member secured to hinge means on adjacent diametrically opposed ends of the peripheral flanges of the other member to pivotally secure the diametric edges of said members to each other in substantially unobstructed spaced relationship and means to clamp the peripheral flanges of said members to each other in substantially unobstructed spaced relationship comprising an extended bent spring lug projecting from the peripheral flange of one member adapted to overlappingly engage a diametrically opposed lug on the peripheral flange of the other member.

6. A mold for use in frying edible food products comprising two substantially semi-circular members having concaved perforated body portions and peripheral flanges, hinge means on diametrically opposed ends of the peripheral flanges of each member secured to hinge means on adjacent diametrically opposed ends of the peripheral flanges of the other member to pivotally secure the diametric edges of said members to each other in substantially unobstructed spaced relationship and means to clamp the peripheral flanges of said members to each other in substantially unobstructed spaced relationship comprising an extended bent spring lug projecting from the peripheral flange of one member adapted to overlappingly engage a diametrically opposed lug on the peripheral flange of the other member.

7. The herein described improved method of producing an edible food product which comprises forming a cavity in one portion of a thin layer of dough, placing an article of food in said cavity, folding the other portion of said layer over said food until the free edges of said layers of dough engage with each other and frying said article in a frying bath while pressing the free edges of said layers of dough together to form a completely sealed, uniformly cooked article of food.

8. The herein described improved method of producing an edible food product which comprises forming a cavity in one-half of a substantially circular thin layer of dough, placing an article of food in said cavity, folding the other half of said layer over said food until the peripheral edges of said layers of dough engage with each other and frying said article in a frying bath while pressing the peripheral edges of said layers of dough together to form a completely sealed, uniformly cooked article of food.

9. The herein described improved method of producing an edible food product which comprises forming two thin layers of dough of substantially equal size, placing an article of food on one layer, superimposing the other layer of dough over said first layer and food until the edges of said layers of dough engage with each other and frying said article in a frying bath while pressing the edges of said layers of dough together to form a completely sealed uniformly cooked article of food.

10. The herein described improved method of producing an edible food product which comprises forming two thin layers of dough of substantially equal size, placing a raw egg on one layer, superimposing the other layer of dough over said first layer and egg until the edges of said layers of dough engage with each other and frying said article in a frying bath while pressing the edges of said layers of dough together to form a completely sealed uniformly cooked article of food.

11. The herein described improved method of producing an edible food product which comprises forming two thin layers of dough of substantially equal size, placing an article of food on one layer, superimposing the other layer of dough over said first layer and food until the edges of said layers of dough engage with each other, pressing the edges of said layers of dough together to form a completely sealed article and frying said article in a frying bath.

12. The herein described improved method of producing an edible food product which comprises forming two thin layers of dough of substantially equal size, placing a raw egg on one layer, superimposing the other layer of dough over said first layer and egg until the edges of said layers of dough engage with each other, pressing the edges of said layers of dough together to form a completely sealed article and frying said article in a frying bath.

13. The herein described improved method of producing an edible food product which comprises forming a thin layer of dough, placing an article of food on a portion of said layer, folding the other portion of said layer of dough over said food until the edges of said layers of dough engage with each other, pressing the free edges of said layers of dough together to form a completely sealed article and frying said article in a frying bath.

In testimony whereof I affix my signature.

ALFRED GIOVANNETTI.